United States Patent [19]
Brooks et al.

[11] Patent Number: 5,164,995
[45] Date of Patent: Nov. 17, 1992

[54] SIGNATURE ANALYSIS APPARATUS

[75] Inventors: Loran D. Brooks, Rochester Hills; Paul J. Eagle, Birmingham; Gary L. Snavely, Farmington Hills, all of Mich.

[73] Assignee: General Motors Corporation, Detroit, Mich.

[21] Appl. No.: 441,145

[22] Filed: Nov. 27, 1989

[51] Int. Cl.$^5$ .............................. G06K 9/00
[52] U.S. Cl. ........................ 382/8; 356/383; 364/474.29; 364/474.35; 382/1
[58] Field of Search ............ 382/1, 8, 48, 41, 7, 382/58, 25; 364/474.29, 474.31, 474.32, 474.35, 474.36, 571.05; 356/385, 376, 383, 398; 358/101, 486, 495, 496, 497

[56] References Cited

U.S. PATENT DOCUMENTS

| | | | |
|---|---|---|---|
| 4,171,161 | 10/1979 | Jung | 356/383 |
| 4,613,234 | 9/1986 | Cruickshank | 356/398 |
| 4,648,024 | 3/1987 | Kato et al. | 364/474.29 |
| 4,776,021 | 10/1988 | Ho | 382/7 |
| 4,902,951 | 2/1990 | Ohta et al. | 364/474.35 |

FOREIGN PATENT DOCUMENTS

2116705  9/1983  United Kingdom.

Primary Examiner—David K. Moore
Assistant Examiner—Yon Jung
Attorney, Agent, or Firm—C. R. Meland

[57] ABSTRACT

A method and apparatus for developing a digital signal that represents the profile of a movable part such as a bolt. The part is moved by a part carrier between a source of radiant energy and a sensor and the sensor develops a voltage that is a function of the profile of the part. This voltage is processed by a programmed microprocessor. The processing of the voltage and the microprocessor operates to develop a digital representation of the part that does not vary with the changes in speed of the part. The part carrier is moved between the source and sensor and voltage variations due to vertical motion of the part carrier are compensated.

12 Claims, 5 Drawing Sheets

SIGNATURE ANALYSIS APPARATUS

This invention relates to signature analysis apparatus that is used to acquire and analyze a signal generated by one or more analog sensors whose amplitude varies as a function of a physical variation of a parameter such as the shape or profile of a part or force or pressure in a process.

More specifically, this invention relates to developing signatures that may represent physical parameters such as pressure, flow or force, or in a parts feeding application can represent the profile of a part.

A system made in accordance with this invention is a microcomputer-based controller which can acquire analog signature voltages from one or more sensors. When analyzing an incoming, or new, process signal it is desirable to eliminate factors which may cause variations in the process signature which are not due to variations in the process, but rather are inherent in the measurement process. In accordance with this invention, the signature signal is processed to eliminate the ambient value of the sensor output.

One example of the foregoing is the problems associated with rotary bowl parts feeders. In this application of this invention it is desired to determine whether or not a part such as a bolt has the proper shape or orientation during the process of segregating or feeding parts from bulk. More specifically, rotary bowl feeders are frequently used to supply small parts to production equipment. This invention determines whether or not the shape and/or orientation of the part is acceptable by passing the part between a source of radiant energy and a sensor that is responsive to radiant energy. The sensor develops an electrical signature signal that has a varying amplitude versus elapsed time as the part passes between the source and sensor.

There are at least two problems associated with the apparatus that has just been described. First of all, when parts are fed from a rotary bowl feeder, the surface of the bowl is not uniform, causing an apparent vertical motion at the point where the fixed sensor is used to measure the profile of a passing part. This invention solves this problem by measuring all part signatures relative to a floating reference or datum surface of the rotary bowl. Accordingly, it is an object of this invention to provide a method of signature analysis wherein the signal that is developed has a floating datum and wherein that signal is processed to provide a signal that compensates for the floating datum.

The second problem resides in developing a useful signature signal where the part that moves between the source of radiation and sensor does not move at a uniform speed. Thus, the length of the signature signal decreases as the speed of the part increases and vice-versa. It, accordingly, is another object of this invention to provide a method of processing signature signal information to obtain a normalized signature signal from a signal that may vary in length due to variations in the speed of movement of the part that is monitored.

This invention will now be described in connection with a rotary bowl parts feeder application. In describing that application, the features of signature normalization and floating datum compensation will be described. It is to be understood that these features can be applied to applications other than rotary bowl feeders, for example, the monitoring of pressure in a process application. Accordingly, these features are not limited to rotary bowl feeders.

Figure 1:
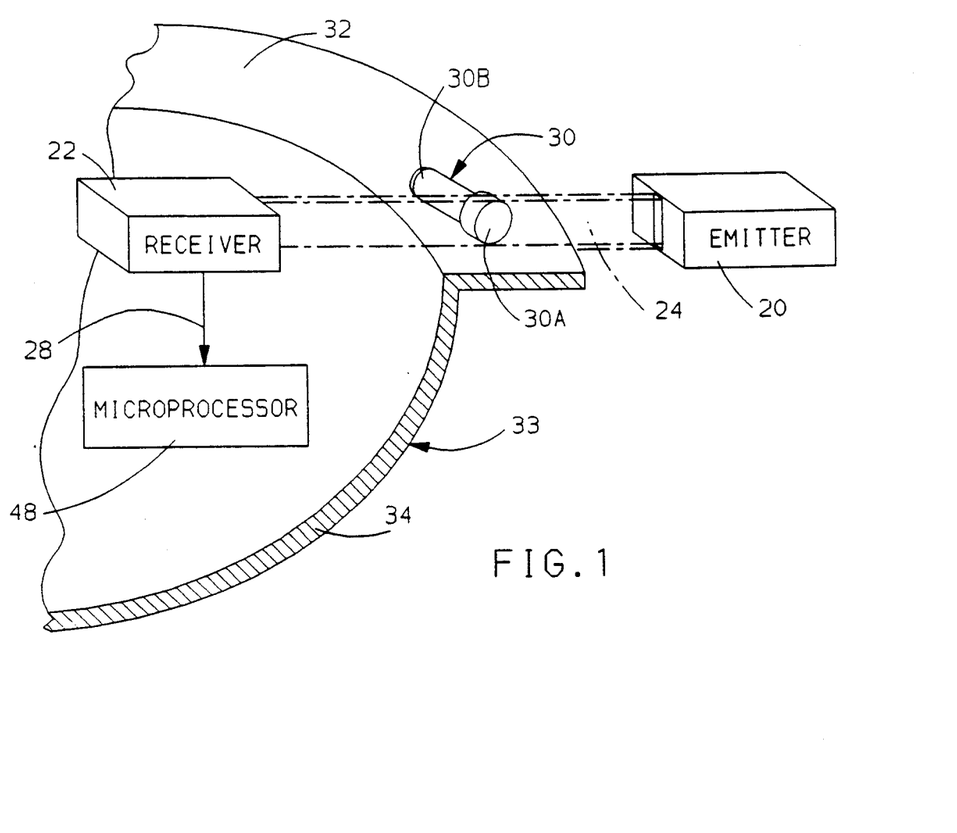
FIG. 1 illustrates a rotary bowl feeder equipped with apparatus for developing an electrical signature or profile signal.

Referring now to the drawings and more particularly to FIG. 1, the reference numeral 20 designates a light source or emitter, for example, an infrared laser source. Disposed in line with source 20 is a sensor or receiver 22. By way of example, and not by way of limitation, the source 20 and sensor 22 may be a Keyence LX Series Through-Beam apparatus. The emitter 20 develops a narrow vertical beam of light 24. The sensor 22 develops a direct output voltage on line 28 which is a function of the percentage of beam obstruction or blockage.

Figure 2:
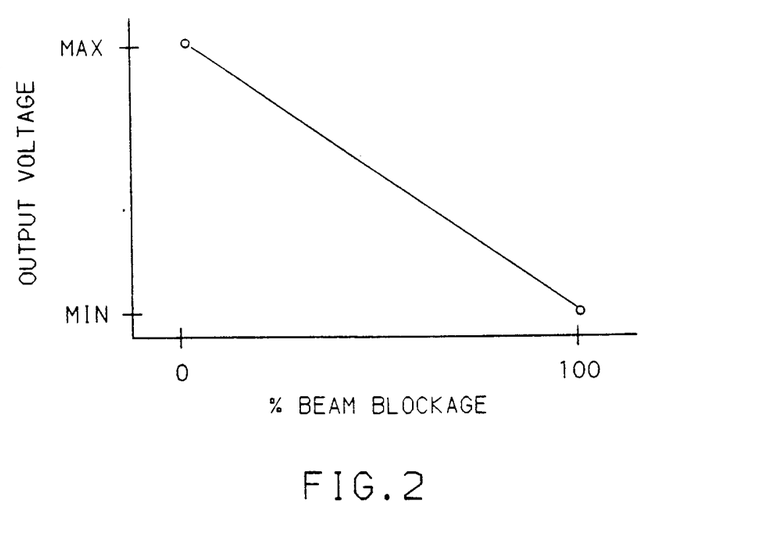
FIG. 2 illustrates the output characteristic of the sensor used in FIG. 1.

The output characteristic of sensor 22 is generally depicted in FIG. 2 where the output voltage of sensor or receiver 22 is plotted against the percentage beam blockage in a vertical direction of light beam 24. It can be seen that if an object is interposed between source 20 and sensor 22 that blocks 100 percent of the light beam 24, the sensor 22 has a minimum output voltage and with no blockage sensor 22 has its maximum output voltage.

Referring now again to FIG. 1, apparatus including light source 20 and sensor 22, is illustrated for determining the profile or signature voltage of a bolt 30 that is moved between sensor 22 and source 20 by an annular surface 32 that is part of a conventional rotary bowl parts feeder 33 and which is rotated by means that are not illustrated. The parts feeder has a bowl portion 34 and bolts move by centrifugal force from bowl portion 34 to part carrying surface 32. The bolt 30 has a head 30A and a threaded shank 30B. The rotary part carrying surface 32 is positioned vertically relative to the projected light beam 24 such that the light beam 24 is interrupted along an axial dimension of the bowl feeder. The top surface 32 is subject to runout, that is, as the bowl feeder rotates its top surface moves vertically up and down relative to fixed source 20 and fixed sensor 22. It can be appreciated that the vertical motion of part carrying surface 32 will cause a corresponding variation in the output voltage of sensor 22, since this motion causes the amount of light beam that is interrupted to vary. The system of this invention compensates for this variation in the vertical motion of surface 32 in a manner that is described hereinafter.

When a bolt 30 passes between emitter 20 and receiver 22, the amount of the light beam that is interrupted by the bolt will be a function of the profile of the bolt. In this regard, head 30A will interrupt more of the light beam than threaded shank 30A.

Figure 3:
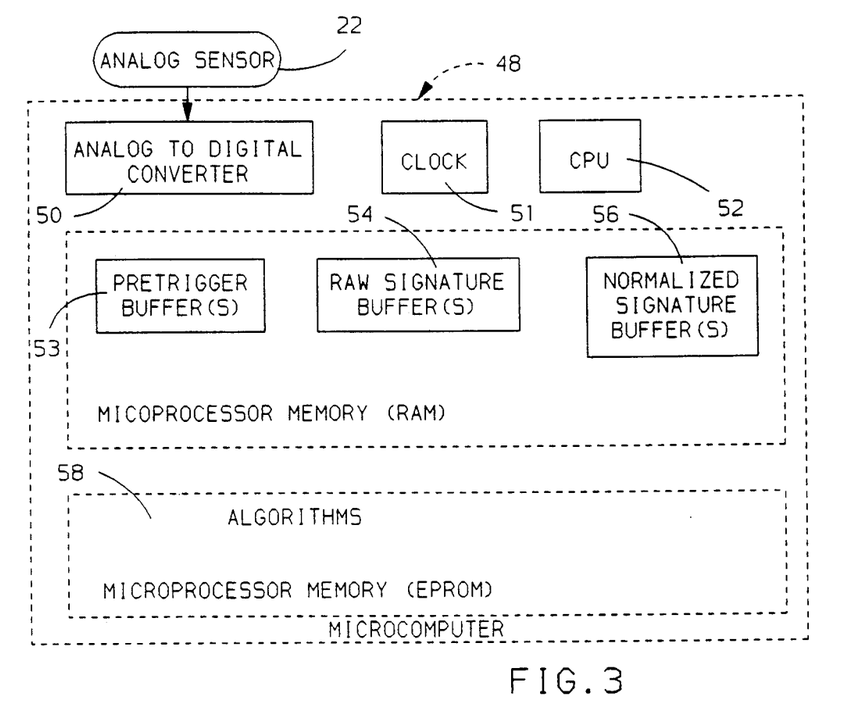
FIG. 3 illustrates microprocessor apparatus for processing analog information.

Referring now to FIG. 3, a microcomputer 48 is illustrated for processing the analog output voltage of sensor 22. In FIG. 3, the sensor 22 is connected to an analog to digital converter 50 of computer 48. Microcomputer 48 further comprises a clock 51, a central processing unit 52, a pretrigger buffer memory 53 comprised of a plurality of memory locations, a raw signature buffer memory 54 having a plurality of memory locations and a normalized signature buffer memory 56 having a plurality of memory locations. Further, microcomputer 48 has a memory 58 which contains the programs or algorithms for sequentially processing the input analog sensor information.

Figure 4:
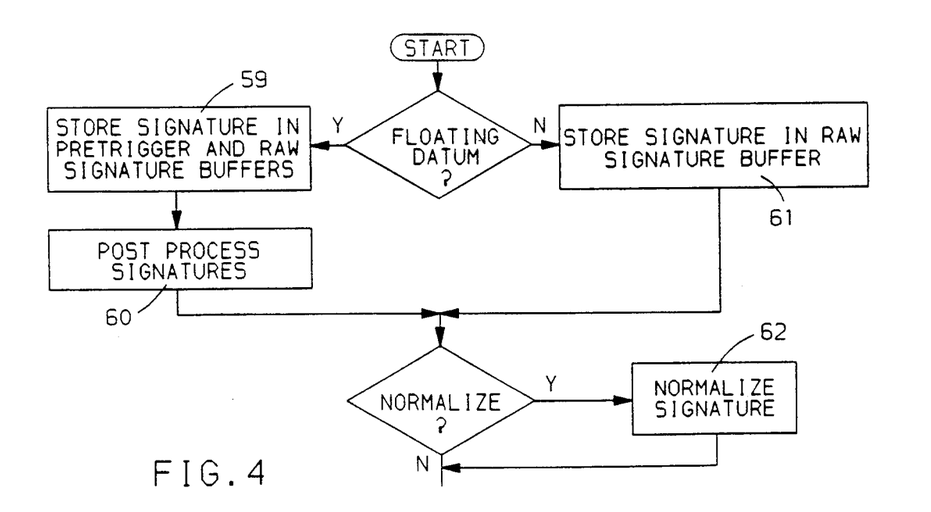
FIG. 4 illustrates a flow chart of steps performed by the microprocessor apparatus of FIG. 3.

FIG. 4 illustrates a generalized overall flow chart for processing the analog voltage from sensor 22. This input signal information can be processed to provide floating datum compensation and/or signature normalization. If only floating datum compensation is desired, the input information is processed by steps 59 and 60. If only normalization is desired, input information is processed by steps 61 and 62. If both floating datum compensation and normalization are desired, input information is processed by steps 59, 60 and 62.

The method of digital data collection, in accordance with this invention, will now be described in connection with FIG. 5. Assume now that analog voltage waveform 64 shown in FIG. 5 was developed by sensor 22 as a bolt 30 moved past the sensor. This analog voltage is digitized at the clock rate of clock 51 by analog to digital converter 50. Each dot represents a point in time where a digital value that is a function of the amplitude of the analog voltage is obtained.

Assume now that the microprocessor system has been set to perform only floating datum compensation, that is, it is set to perform steps 59 and 60 shown in FIG. 4. In this mode of operation, the system causes the pretrigger buffer 53 to be filled with digital data. The pretrigger buffer has a certain length which, in accordance with FIG. 5 will be assumed to be five consecutive data points. Buffer 53 operates as a circular buffer that is well known in data structures. This function is depicted diagrammatically in FIG. 5. Thus, the circular buffer 53 can be viewed as a window that moves from left to right in FIG. 5. The newest data point is placed in buffer 53 and is designated as A and the oldest data point as B.

It will be appreciated that data corresponding to the amplitude of portion 66 of the sensor output voltage waveform is being stored in buffer 53. Waveform portion 66 represents the output of sensor 22 due to vertical motion of surface 32, that is, portion 66 is a waveform that is developed when there is no bolt between emitter 20 and sensor 22. The loading of pretrigger buffer 53 begins at T0 shown in FIG. 5.

The pretrigger buffer 53 continues to be updated at each clock pulse until a voltage transition of certain magnitude occurs in waveform 64 at time T1. Thus, the microprocessor is programmed to detect that the voltage waveform has gone from a value lower than the trigger voltage shown in FIG. 5 to a value higher than this trigger voltage. When this transition occurs, the entry of data to buffer 53 is terminated. In FIG. 5, and assuming that buffer 53 has a length of five data points, the final digital data stored in buffer 53 will correspond to data points C, D, E, F and G. Data point C is the oldest data and will be referred to hereinafter as $P_{OLD}$. It can be appreciated that data point C represents an analog voltage value corresponding to movement of the bowl surface 32 and does not reflect any part signature voltage.

At time T1, the pretrigger buffer 53 has been filled with certain data as has been described. Further, at time T1, the raw signature buffer 54 begins to receive and store digital data points between time T1 and T2. At time T2, voltage 64 has gone from a value higher than the trigger voltage to a value lower than the trigger voltage and the microprocessor is programmed to recognize this and, accordingly, terminates the digitizing of waveform portion 64. As a result of what has been described, waveform portion 64 is digitized at each clock pulse between times T1 and T2 and the consecutive digitized data is stored in raw signature buffer 54.

When the digital data processing has been completed, as described, the pretrigger buffer 53 contains digital data values C-G and raw signature buffer 54 contains consecutive digital data values between times T1 and T2.

Figure 5:
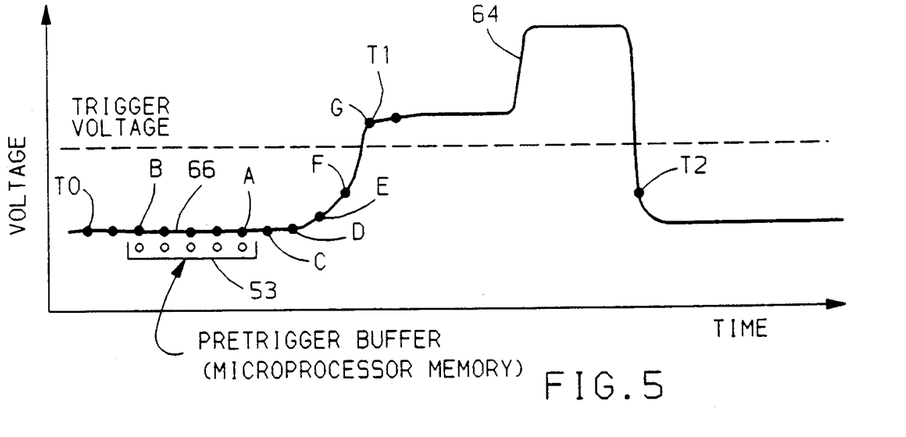
FIG. 5 illustrates voltage waveforms that are useful in understanding this invention.

The microprocessor is programmed to now insert the digital data stored in the pretrigger buffer 53 (C-G) into the raw signature buffer in such a manner that the raw signature buffer 54 now contains digital data that corresponds to the waveform shown in FIG. 5 from data point C to time T2. The raw signature buffer 54 now contains digital data that represents the output waveform of sensor 22 from data point C to time T2.

The combined data stored in raw signature buffer 54 is now post-processed to provide floating datum compensation. This post-processing, as well as the data acquisition for the floating datum compensation mode of operation, is shown in FIG. 6 which illustrates a flow chart of programmed steps that are executed by the microprocessor to provide floating datum compensation.

Figure 6:
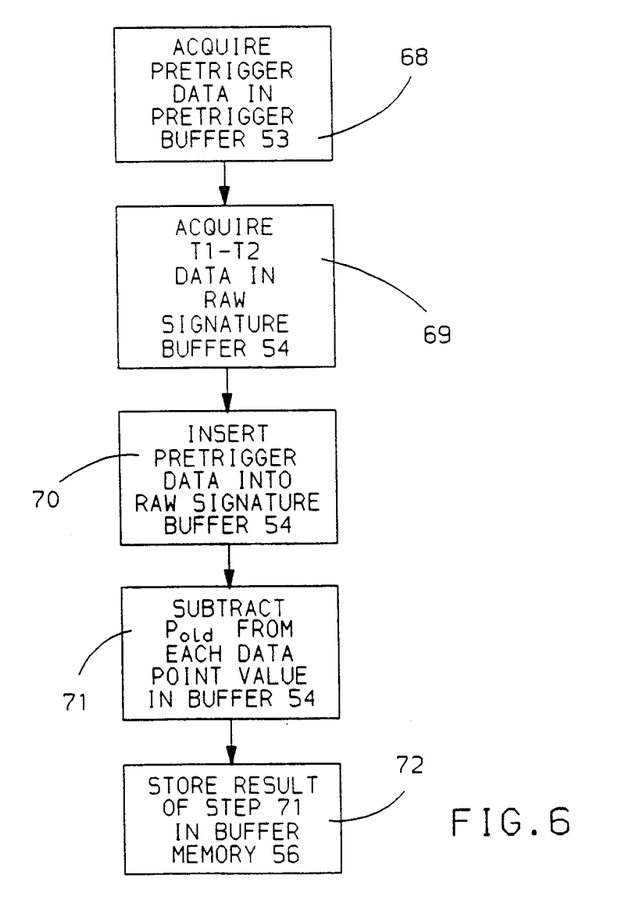
FIG. 6 is a flow chart that is related to floating datum compensation.

Referring now to FIG. 6, the first step 68 is to acquire the pretrigger data for pretrigger buffer 53. This has been described and relates to acquiring data points C-G (FIG. 5). In step 69 the digital data between T1 and T2 of FIG. 5 is developed and placed in buffer memory 54. In step 70 the pretrigger data acquired in step 68 is inserted or placed in buffer 54. In step 71, $P_{OLD}$ which is data value C of FIG. 5, is identified and subtracted from each data value in buffer 54. That is, C is subtracted from C, then from D and so on until C has been subtracted from each data value that occurs between C and T2 of FIG. 5. In step 72, the result of this subtraction is stored in buffer memory 56 which stores the final result of the floating datum post-processing.

It can be appreciated that floating datum compensation provides a true digital representation of the profile of bolt 30. In this regard, it can be appreciated that the amplitude of waveform portion 64 will vary due to vertical motion of surface 32. By using floating datum compensation, a digital representation is obtained of the bolt independent of the vertical position of the portion of surface 32 that carries the bolt. In this regard, a digital value (point C of FIG. 5) that represents the vertical position of surface 32 is obtained and it corresponds to a point on surface 32 that is just ahead of bolt 30. Thus, a digital value is obtained (point C) just prior to the time that bolt 30 is passed between emitter 20 and receiver 22 and the digital value of C is then subtracted in a manner that has been described.

It can be appreciated that in the previous example, the information in the pretrigger buffer was inserted into the raw signature buffer thus allowing the signature to include the transition from the surface of the bowl to the part signature. The use of the pretrigger buffer for floating datum compensation can also be used without inserting the contents of the pretrigger buffer into the raw signature buffer. In this case, the value of $P_{OLD}$ would be subtracted from the digital data between $T_1$ and $T_2$ where $T_1$ is the first value in the raw signature buffer. Further, in this case step 70 of FIG. 6 would not be used.

The purpose of the normalization procedure or processing is to compensate for variation in the speed of movement of the part or bolt 30. To explain this, reference should be had to FIG. 7 which discloses three different signature voltage waveforms corresponding to three different speeds of movement of bolt 30 and a resultant normalized signature waveform that is developed after processing. The voltage waveforms, entitled signature #1, #2 and #3 represent the output voltage of sensor 22 plotted against units of time. These are generalized waveforms and are not intended to depict actual values. Signature #1 corresponds to a speed of movement of bolt 30 that is slower than the other two signatures. Signature #2 corresponds to the highest speed of movement and signature 3 corresponds to a speed that is intermediate the speeds that would produce signature #1 and signature #2.

Figure 7:
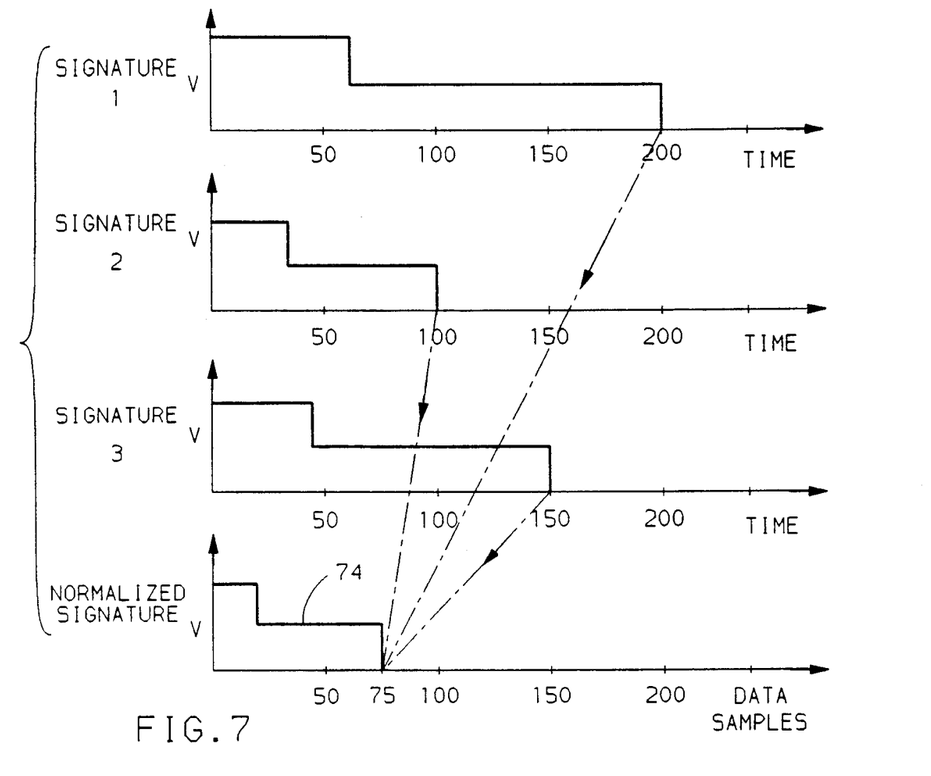
FIG. 7 illustrates the effect of normalizing the output signal of a sensor.

The purpose of the normalization procedure or processing is to produce a digitized signal represented by the waveform 74, also identified as the normalized signature, which has a length that is constant number of data samples or data points. Putting it another way, the varying lengths of the signatures which are caused by variations in speed are translated into a signal 74 that has a constant length.

Figure 8:
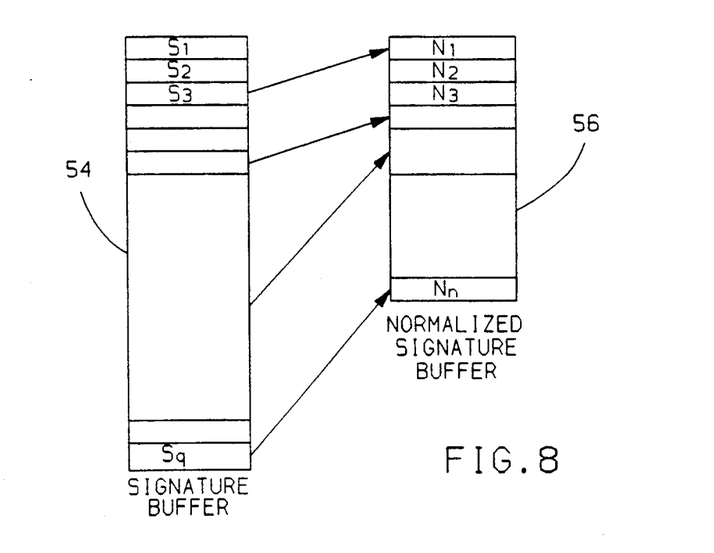
FIG. 8 illustrates buffer memory apparatus to effect normalizing
Figure 9:
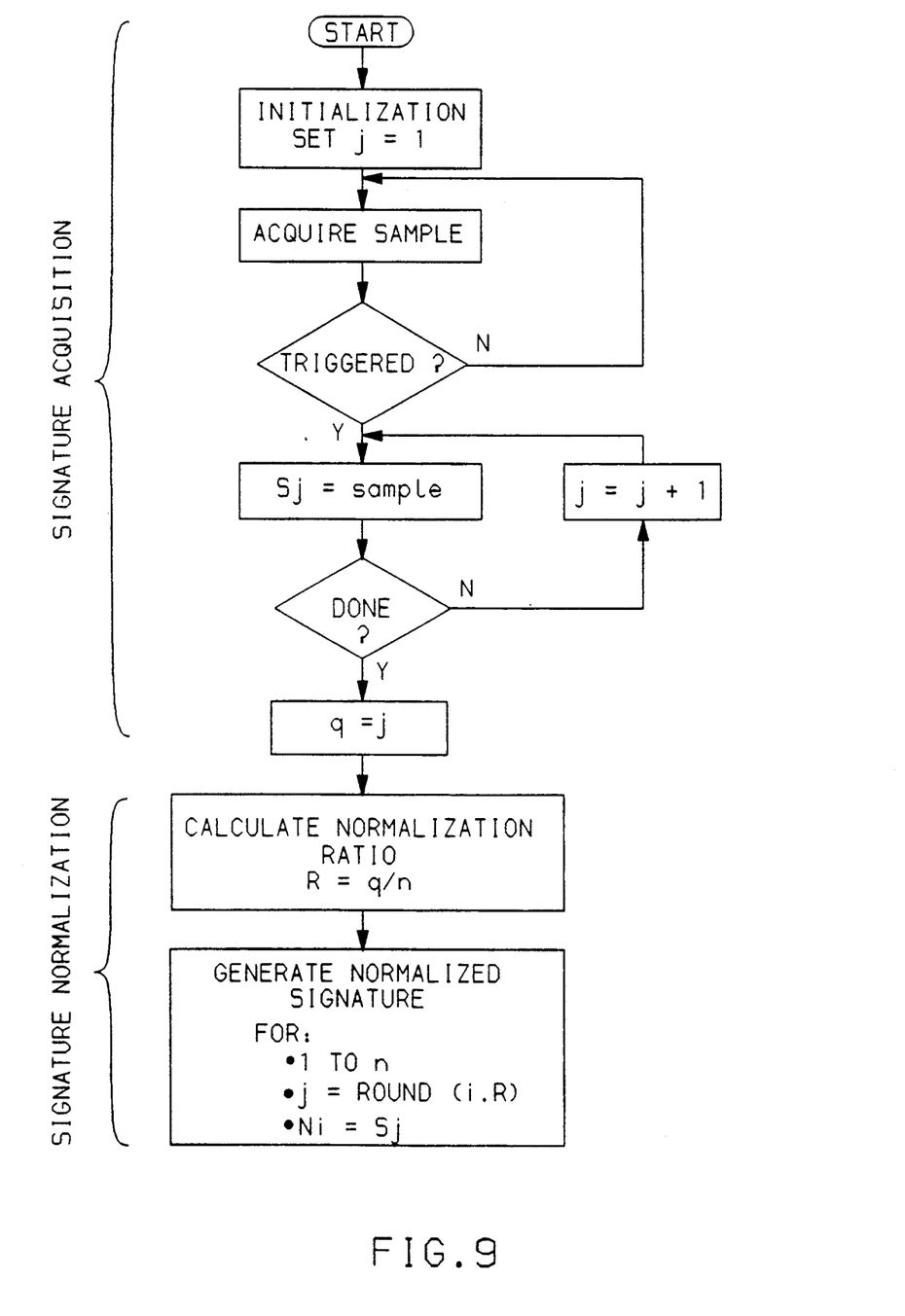
FIG. 9 illustrates a flow chart to effect normalizing.

In order to achieve what has just been described, reference should now be had to FIGS. 8 and 9. FIG. 8 illustrates the previously described raw signature buffer memory 54 and the normalized signature buffer memory 56 together with arrows indicating transfer of data from memory 54 to memory 56.

FIG. 9 illustrates a flow chart of steps that are executed under program control by the microprocessor. Certain terms are used in FIG. 9 which are defined as follows:

n = Length of normalization buffer 56.
j = Index into signature buffer 54.
q = Length of acquired signature signal.
R = Normalization ratio (R = q/n).
i = Index into normalization buffer 56.
$N_i$ = Value of normalization buffer at index i.
$S_j$ = Value of signature buffer at index j.

In FIG. 9, the steps designated as signature acquisition illustrates the steps that are executed to obtain a digital representation of, for example, the signature voltage waveform 64 shown in FIG. 5. The steps designated signature normalization refers to processing a signal, like signature #1 of FIG. 6 to obtain the normalized signature waveform.

In FIG. 9, the term TRIGGERED? refers to the start of data acquisition (Time T1 of FIG. 5). The term DONE? refers to the termination of data acquisition (Time $T_2$ of FIG. 5).

A worked example of the normalization procedure or processing will now be given as an aid in understanding this invention. Let it be assumed that n, the length of the normalized buffer 56, is equal to 75 shown in FIG. 7.

For the first condition of operation, let it be assumed that the signature #1 signal of FIG. 7 is being processed. The length of the acquired signature q is, accordingly, equal to 200. Based on this, the following is calculated by the microprocessor:

$R = q/n = 200/75 = 2.66$
For i = 1 to n
j = Round (i×R) and $N_i = S_j$
Therefore:
i = 1
j = Round (1×2.66) = 3
$N_1 = S_3$
i = 25
j = Round (25×2.66) = 66
$N_{25} = S_{66}$
i = 75
j = Round (75×2.66) = 200
$N_{75} = S_{200}$ In a second condition of operation, let it be assumed that signature #3 is being processed and again that n = 75. Based on this, the following is calculated by the microprocessor:

$R = q/n = 150/75 = 2$
i = 0
j = Round (1×2) = 2
$N_1 = S_2$
i = 25
j = Round (25×2) = 50
$N_{25} = S_{50}$
i = 75
j = Round (75×2) = 150
$N_{75} = S_{150}$ The term "Round" as used above means that the calculation has been rounded to the nearest integer.

The length of the buffers corresponds to a given number of clock pulses or number of consecutive memory locations.

It should be appreciated that in obtaining the normalized signature length of 75, the lengths q of the acquired input signatures above have, in effect been compressed such that the n equally spaced samples in the normalized signature buffer are taken from the q samples in the signature buffer. Putting it another way and referring to signature #1, every q/n clock pulse of digital data from a memory location of signature buffer 54 is transferred to normalized signature buffer 56. This sequentially misses some of the data in certain of the consecutively occurring memory locations of signature buffer 54, but the clock rate is sufficiently high that the digital data represented by waveform 64 is an adequate replica of a signature voltage developed by sensor 22. In this regard, it will be appreciated that when signature #1 (FIG. 7) is being processed, the data in memory locations $S_1$ and $S_2$ of FIG. 8, as well as some subsequent consecutively occurring data, will not be transferred from signature buffer 54 to normalized signature buffer memory 56.

In the practice of this invention, sensing apparatus other than an infrared laser can be utilized. For example, an inductive proximity detector could be used.

Floating datum compensation and normalization have been described in connection with a parts feeding application. However, as has been pointed out, these features have general applicability. For example, in a pressure sensor application where it is desired to use a pressure sensor to develop an electrical signal over a period of time, the signal that is developed will have a certain profile. Further, the ambient output of the pressure sensor may vary, for example, with changes in temperature. Such an ambient variation corresponds to the run-out of surface 32 in a parts feeding application. Both floating datum compensation and normalization can be applied to the pressure sensor signal.

In the use of this invention, the system is used in a "teach mode" where parts are passed between the emitter 20 and receiver 22 and reference data is acquired in a manner described. This reference data is then stored in memory. The system can now accept or reject parts by comparing data acquired as parts pass between the emitter and receiver with the reference data in memory.

The embodiments of the invention in which an exclusive property or privilege is claimed are defined as follows:

1. A method of developing a digital signal that represents the profile portion of an analog signal where the analog signal is comprised of a variable datum voltage portion that precedes the profile portion, the steps comprising, developing and storing a plurality of consecutively occurring first digital data signals that consecutively represent the amplitude of the datum voltage portion, terminating the developing and storing of said first digital data signals at the beginning of the development of said profile portion, developing and storing second digital data signals that consecutively represent the amplitude of said profile portion, and then combining at least some of said first data signals that precedes the beginning of said profile portion with said second data signals in such a manner as to develop a digital signal that represents the profile portion and which is compensated for said variations in said datum voltage.

2. A method of developing a digital signal that represents the profile portion of an analog signal where the analog signal is comprised of a variable datum voltage portion that precedes the profile portion, the steps comprising, developing and storing a plurality of consecutively occurring first digital data signals during the occurrence of said datum voltage portion and during the occurrence of a beginning portion of said profile portion that consecutively represent the amplitude of the datum voltage portion and the amplitude of said beginning portion of said profile portion, developing and storing second digital signals that consecutively represent the amplitude of said profile portion starting with the said beginning portion of said profile portion, developing a composite digital signal that is comprised of said first digital signals followed by said second digital signals, and then combining at least one of said first digital signals that represents a part of said datum voltage portion with the digital signal of said composite digital signal in such a manner as to develop a digital signal that is compensated for said variations in said datum voltage.

3. A method of developing a compensated signature signal from a measuring apparatus that develops a variable datum voltage that is produced by the measuring apparatus and a signature voltage that has a profile indicative of a parameter to be measured, the steps comprising, developing and storing a plurality of consecutively occurring first digital data signals that consecutively represent the amplitude of the datum voltage, terminating the developing and storing of said first digital data signals at the beginning of the development of said signature voltage, developing and storing second digital data signals that consecutively represents the amplitude of said signature voltage, and then combining certain of the first data signals that precedes the beginning of said signature voltage with said second data signals in such a manner as to develop a compensated digital signature signal.

4. The method according to claim 3 where said certain of said first data signals is subtracted from said second data signals.

5. A method of developing a signature signal that represents the profile of a moving part, the steps comprising, developing an analog signature direct voltage by passing the part past a sensor which develops a signature voltage the amplitude of which and the length of which corresponds to the profile and length of the part, developing and storing a plurality of consecutively occurring digital data signal values in a plurality of memory locations of a first memory that correspond to consecutively occurring amplitudes of said analog signature voltage for a period of time corresponding to the time period that said part passes past said sensor and then transferring digital data from the memory locations of said first memory to memory locations of a second memory in such a manner that the data in said second memory represents a constant number of data signal values.

6. The method according to claim 5 where the sensor is responsive to radiant energy and where the part is passed between the sensor and a source of radiant energy.

7. The method according to claim 5 where the part is supported by a rotatable part supporting surface that causes the part to be moved past the sensor.

8. Apparatus for developing a digital signal that represents the profile of a part comprising, a sensor, a movable part supporting means carrying a part that is moved by said part supporting means past said sensor, said sensor developing an analog voltage that represents the profile of the part, and digital processing means responsive to said analog voltage for developing a digital representation of the profile of said part, said digital processing means including means for developing a digital representation of the profile of said part that is comprised of a predetermined number of consecutively occurring data signal values, said digital processing means operating such that said predetermined number of data signal values is substantially constant regardless of the speed of movement of said part, said apparatus having no means for developing and applying an input signal to said digital processing means that represents the speed of movement of said part supporting means.

9. The apparatus according to claim 8 where said part supporting means is positioned to effect the voltage developed by said sensor and wherein said digital processing means includes means for compensating for voltage variations caused by a motion of said part supporting means that is in a direction other than the direction of movement of said part supporting means so as to cause a variation in the voltage developed by said sensor.

10. Apparatus for developing a digital signal that represents the profile of a moving part comprising, a movable part carrier adapted to carry and move a part to be monitored past a sensor means, said part carrier and part being so positioned relative to said sensor means that said sensor means develops a datum analog voltage which varies in magnitude in response to movement of said part carrier in a direction substantially normal to the plane of part carrying movement and a signature analog voltage that varies in magnitude as a function of the profile of said part, means for developing and storing first consecutively occurring digital data signals that represent consecutive magnitudes of said datum voltage, means for developing and storing second consecutively occurring digital data signals that represent consecutive magnitudes of said signature voltage, and means combining said second digital data signals with at least one of said first digital signals to provide a digital signal that is compensated for said movement of said part carrier in said direction normal to the plane of part carrying movement.

11. A method of developing a digital signal that represents the profile of a part that is carried and moved by a part supporting surface where the surface and part are moved past a sensor means that develops an analog voltage that has a first variable voltage portion caused by movement of said surface in a direction substantially normal to the direction of movement of said part and a second variable voltage portion that represents the profile of said part and which is developed when said part moves past said sensor means, the steps comprising, developing and storing a plurality of consecutively occurring first digital signals that represent said first voltage portion just prior to the time that said second voltage portion is developed, developing and storing consecutively occurring second digital signals that represent said second voltage portion, and then combining at least one of said first digital signals with said second digital signals to provide a digital signal that represents the profile of said part and which is compensated for movement of said surface in said direction substantially normal to the direction of movement of said part.

12. The method according to claim 11 where said at least one of said first digital signals is subtracted from said second digital signals.

* * * * *